(12) United States Patent
Thornburgh

(10) Patent No.: US 10,079,884 B2
(45) Date of Patent: Sep. 18, 2018

(54) STREAMING DIGITAL CONTENT SYNCHRONIZATION

(71) Applicant: Adobe Systems Incorporated, San Jose, CA (US)

(72) Inventor: Michael Christopher Thornburgh, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 396 days.

(21) Appl. No.: 15/069,839

(22) Filed: Mar. 14, 2016

(65) Prior Publication Data
US 2017/0264683 A1 Sep. 14, 2017

(51) Int. Cl.
| | | |
|---|---|---|
| H04N 21/262 | (2011.01) |
| H04N 21/236 | (2011.01) |
| H04N 21/434 | (2011.01) |
| H04L 29/06 | (2006.01) |
| H04L 29/08 | (2006.01) |
| H04N 21/43 | (2011.01) |
| H04L 29/04 | (2006.01) |

(52) U.S. Cl.
CPC ...... *H04L 67/1095* (2013.01); *H04L 65/4084* (2013.01); *H04L 65/60* (2013.01); *H04L 67/02* (2013.01); *H04N 21/23605* (2013.01); *H04N 21/26241* (2013.01); *H04N 21/4305* (2013.01); *H04N 21/4343* (2013.01)

(58) Field of Classification Search
CPC ..... H04L 65/4084; H04L 65/60; H04L 67/02; H04L 67/1095; H04N 21/23605; H04N 21/26241; H04N 21/4305; H04N 21/4343
See application file for complete search history.

(56) References Cited

U.S. PATENT DOCUMENTS

| 2008/0229025 A1* | 9/2008 | Plamondon | G06F 12/0862 |
| | | | 711/126 |
| 2012/0110138 A1* | 5/2012 | Zhang | H04L 65/4084 |
| | | | 709/219 |

(Continued)

FOREIGN PATENT DOCUMENTS

| EP | 2706754 | 3/2014 |
| WO | WO-2012046487 | 4/2012 |

OTHER PUBLICATIONS

"Combined Search and Examination Report", GB Application No. 1618588.6, dated May 2, 2017, 5 pages.

*Primary Examiner* — Alina A Boutah
(74) *Attorney, Agent, or Firm* — Wolfe-SBMC

(57) ABSTRACT

Streaming digital content synchronization techniques are described. A response is received to a request to stream the digital content. The response includes a time at which the digital content was last modified (e.g., a last-modified header) and a time at which the response was generated, e.g., a date header. An age is calculated by subtracting the time at which the digital content was last modified, e.g., the last-modified header, from the time at which the response was generated, e.g., the date header. An age describing an amount of time the response spent in one or more caches, if available, is added as part of this age. The time is determined by subtracting the age from a predefined setback time and the stream of the digital content is rendered based at least in part on the determined time.

20 Claims, 7 Drawing Sheets

(56) References Cited

U.S. PATENT DOCUMENTS

| | | | |
|---|---|---|---|
| 2014/0010517 A1* | 1/2014 | Sheffler | H04N 9/79 386/226 |
| 2014/0012939 A1* | 1/2014 | Park | H04L 67/2842 709/213 |
| 2016/0021164 A1* | 1/2016 | Chakarapani | H04L 65/607 709/224 |
| 2017/0012838 A1* | 1/2017 | Kashtan | G06F 8/73 |

* cited by examiner

STREAMING DIGITAL CONTENT SYNCHRONIZATION

BACKGROUND

Synchronization of digital content rendering is a primary consideration not only for co-located client devices but also for remotely located client devices. For example, consider a sports bar having multiple televisions that are viewable at any one time. A person viewing these televisions simultaneously may quickly become lost as to "what is going on" when shown different parts of a sporting event, even if just a few seconds off. Accordingly, lack of synchronization between these televisions may become distracting to the point of removing the benefit of including the multiple televisions.

This consideration even exists in situations in which the client devices are remotely located from each other. For example, social media and other communication techniques enable users to communicate and comment in real time with each other as events occur. In a home viewing example, if viewers are sharing reactions on social media, live digital content that is significantly out of sync may cause some viewers to spoil exciting plot developments, or otherwise lose assumed shared context for the program. Accordingly, a lack of synchronization in rendering by remote devices may cause a lack of synchronization in these communications, which may quickly become frustrating to these viewers.

As viewers expect and have experienced close synchronization with conventional broadcast television, viewers also want a similar experience with Internet streaming media. In conventional broadcast television, multiple television receivers receive the same broadcast signal simultaneously and display the transmitted video immediately. Accordingly, the presentations are inherently in sync. However, conventional live HTTP streaming media techniques are typically out of sync by up to two or more segment durations, where segments are typically six to ten seconds in length.

In one conventional HTTP streaming example, live playback begins at a number of segments behind the most recently posted segment according to a manifest file. The number of segments "behind" depends on the timing of the acquisition of a manifest file and when a new revision and new segment is posted as well as time taken to select, obtain, and render the new segment. Accordingly, it has been observed that client devices may be out of sync by up to two segments based on differences in this timing, e.g., anywhere from six to twelve seconds. In another example, local "wall-clock" times are specified in a manifest file to indicate a time at which a segment is to be rendered. However, this approach requires the clocks on each of the client devices to be synchronized, one to another, which is not typically the case. Other proprietary techniques have also been developed to determine "what time it is" in order to render an appropriate segment of content. These proprietary techniques, however, typically require inclusion of additional software and hardware resources (e.g., network synchronization) which are typically not be available on each client device.

SUMMARY

Streaming digital content synchronization techniques are described. In a digital medium environment to stream digital content, rendering of content is synchronized by determining a time to render the content. To do so, a response is received to a request to stream the digital content. The response includes a time at which the digital content was last modified (e.g., a last-modified header) and a time at which the response was generated (e.g., a date header).

An age is calculated by subtracting the time at which the digital content was last modified, e.g., the last-modified header, from the time at which the response was generated (e.g., the date header). An amount of time the response spent in one or more caches, if available (e.g., an age header), is added as part of this age.

The time is determined by subtracting the age from a predefined setback time, and the stream of the digital content is rendered based at least in part on the determined time. In order to improve synchronization accuracy between client devices, times may be indicated using fractional seconds. In order to reduce latency, the setback time may be based at least in part on an amount of time determined between revisions to the digital content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
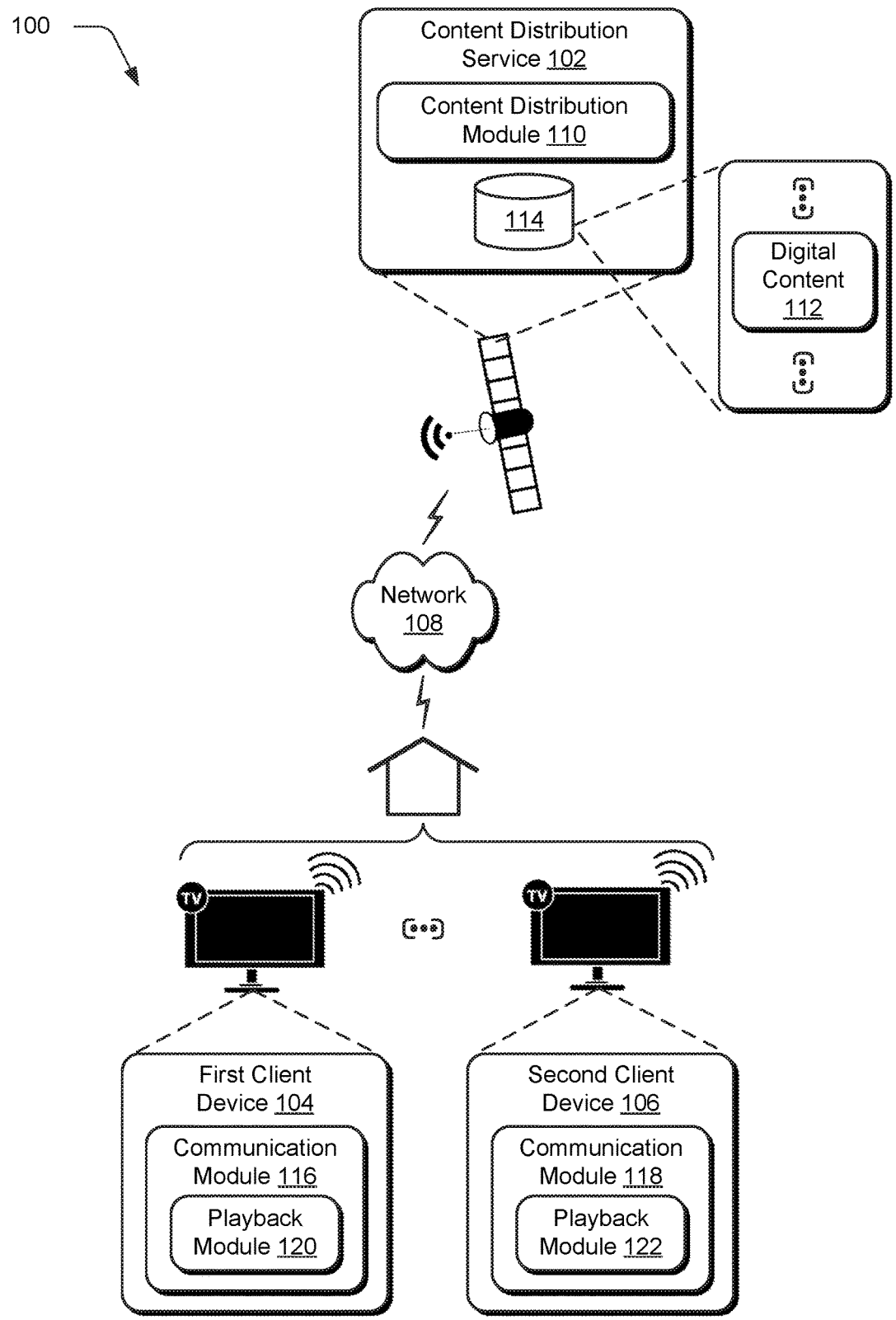
FIG. 1 is an illustration of an environment in an example implementation that is operable to employ streaming digital content synchronization techniques described herein.

Conventional techniques to stream digital content that rely on segments and manifest files often fail to achieve synchronized playback between client devices. In manifest and segment based streaming techniques, such as streaming techniques that use a Hypertext Transfer Protocol (HTTP), a manifest file is used to map time periods to segments of digital content within a media presentation, the segments typically being a few seconds in duration. Playback of the digital content thus begins at a number of segments behind a most recently posted segment according to a manifest file. The number of segments "behind" depends on the timing of the acquisition of a manifest file, when a new revision and new segment is posted, and so on. Accordingly, this may vary from client device to client device, causing a lack of synchronization which can be disconcerting when rendered as previously described.

Techniques and systems are described to stream digital content to support synchronized rendering of content by client devices. These techniques are usable in streaming techniques that rely on manifest files and segments within a media file, such as according to a hypertext transfer protocol (HTTP). For example, a content distribution service may form a response to a request to stream digital content, e.g., for a manifest file. The response specifies a time at which the requested resource (e.g., the manifest file) was last modified and a time at which the response was formed. This may be performed using existing hypertext transfer protocol (HTTP) headers, e.g., a last-modified header and a date header, and thus may be performed without using additional resources or requiring special configuration of a client device that is to receive the response. An age may also be specified for an amount of time the response has spent in a cache (e.g., an HTTP age header) during communication of the response from the content distribution service to the client device. This may include a cache of the content distribution service or caches of intermediaries used to communicate the response via a network between the content distribution service and the client device.

From this information in the response, the client device is able to determine a time at which to render the digital content that is synchronized with other client devices that are also to render the digital content. To do so, the client device first calculates an age by subtracting the time at which the digital content was last modified from the time at which the response was generated. In an HTTP example, this is performed by subtracting the last-modified header from the date header. Additionally, an age header may also be employed to add an amount of time that the response spent in a cache as part of this age, if available.

A time is then determined to define when to render the digital content. The time is determined by subtracting the age from a setback time. The setback time, for instance, may include an amount of time for buffering to promote consistent playback. In live streaming, the setback time is set as the time behind the end of the most recently available segment. This time is then used as a basis to render segments of the digital content by the client device. Further, use of this technique by a plurality of client devices promotes synchronized rendering of the content between those devices without requiring synchronization of local clocks or proprietary communication techniques.

Additionally, in order to shorten latency in the rendering of the digital content, the setback time may be set based on an ascertained time between revisions of segments of the digital content. For example, latency may be reduced by using this technique to predict how long until a next revision of the manifest file (and therefore a corresponding segment) will be published. A setback time is then set based on this time in order to provide sufficient buffering yet render the content as fast as feasible. Further reductions may be achieved through use of headers that specify fractional seconds and thus may further promote tighter synchronization between client devices. In this way, synchronized rendering of streaming content is promoted by client devices whether located locally or remotely from each other by using a common technique to define "when" this rendering is to occur. Further discussion of these and other examples is included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital content streaming techniques described herein. The illustrated environment 100 includes a content distribution service 102 that is communicatively coupled to a plurality of client devices (examples of which are illustrated as first and second client devices 104, 106) via a network 108. The content distribution service 102 is configurable in a variety of ways, such as one or more computing devices to implement a website provider, service provider, web service, satellite provider, terrestrial cable provider, or any other distributor of content employing a network 108. Accordingly, the network 108 is also configurable in a variety of ways, such as the internet or "World Wide Web," a peer-to-peer network, and so forth.

Figure 7:
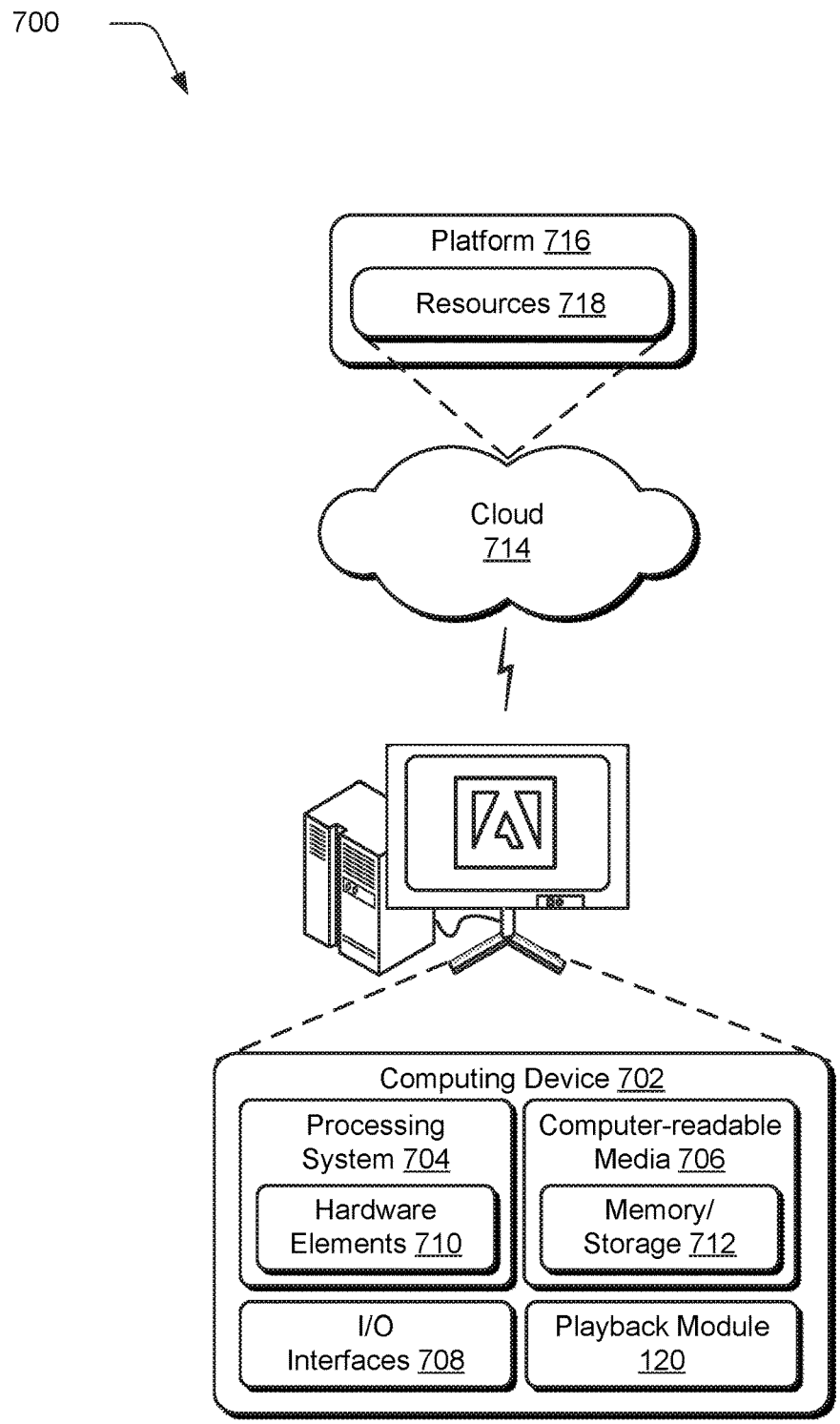
FIG. 7 illustrates an example system including various components of an example device that can be implemented as any type of computing device as described and/or utilize with reference to FIGS. 1-6 to implement embodiments of the techniques described herein.

The first and second client devices 104, 106 are also configurable using a variety of computing devices as further described in relation to FIG. 7. A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices) that is configured to communicate via the network 108. Additionally, the first and second client devices 104, 106 may be implemented using a plurality of different devices, e.g., multiple servers.

The content distribution service 102 includes a content distribution module 110 that is implemented at least partially in hardware to control streaming of digital content 112 via the network 108, which is illustrated as stored in storage 114. Digital content 112 may take a variety of forms, such as media, video, audio, and other forms of media that is configured for digital storage, communication (e.g., streaming), and rendering.

The first and second client devices 104, 106 are illustrated as including respective communication modules 116, 118. The communication modules 116, 118 are representative of functionality implemented at least partially in hardware to communicate via the network 108, such as to communicate with the content distribution service 102 to stream the digital content 112. This includes dedicated applications, plug-in modules, network enabled applications, browsers, and so forth. An example of functionality employed by the communication modules 116, 118 is represented by playback modules 120, 122 implemented at least partially in hardware to control navigation and rendering of the digital content 112.

As previously described, users expect synchronization in the rendering of streaming content. In traditional broadcast television, for instance, client devices such as television receivers are configured to receive the same broadcast signal simultaneously and immediately render the received signal for display. This causes the display of the traditional broadcast television to be inherently synchronized. However, in conventional live streaming techniques that involve use of a manifest file and segments (e.g., according to a hypertext transfer protocol), this is not so due to timing of acquisition of the manifest file, timing of when a new revision and corresponding segment is posted, time taken to request and receive a response to the request that includes the segment, and so forth. Consequently, this lack of synchronization of conventional live streaming techniques may run counter to user expectations.

Accordingly, the playback modules 120, 122 are configured to employ techniques to time rendering of a stream of the digital content 112 such that synchronized rendering is promoted between the first and second client devices 104, 106. Further, synchronization as described herein may be achieved without use of a dedicated communication channel between the first and second client devices 104, 106, e.g., to synchronize local clocks of the client devices 104, 106, or use of proprietary techniques. An example of timing of the rendering of the digital content which achieves this synchronization is described in the following and shown in corresponding figures.

Figure 2:
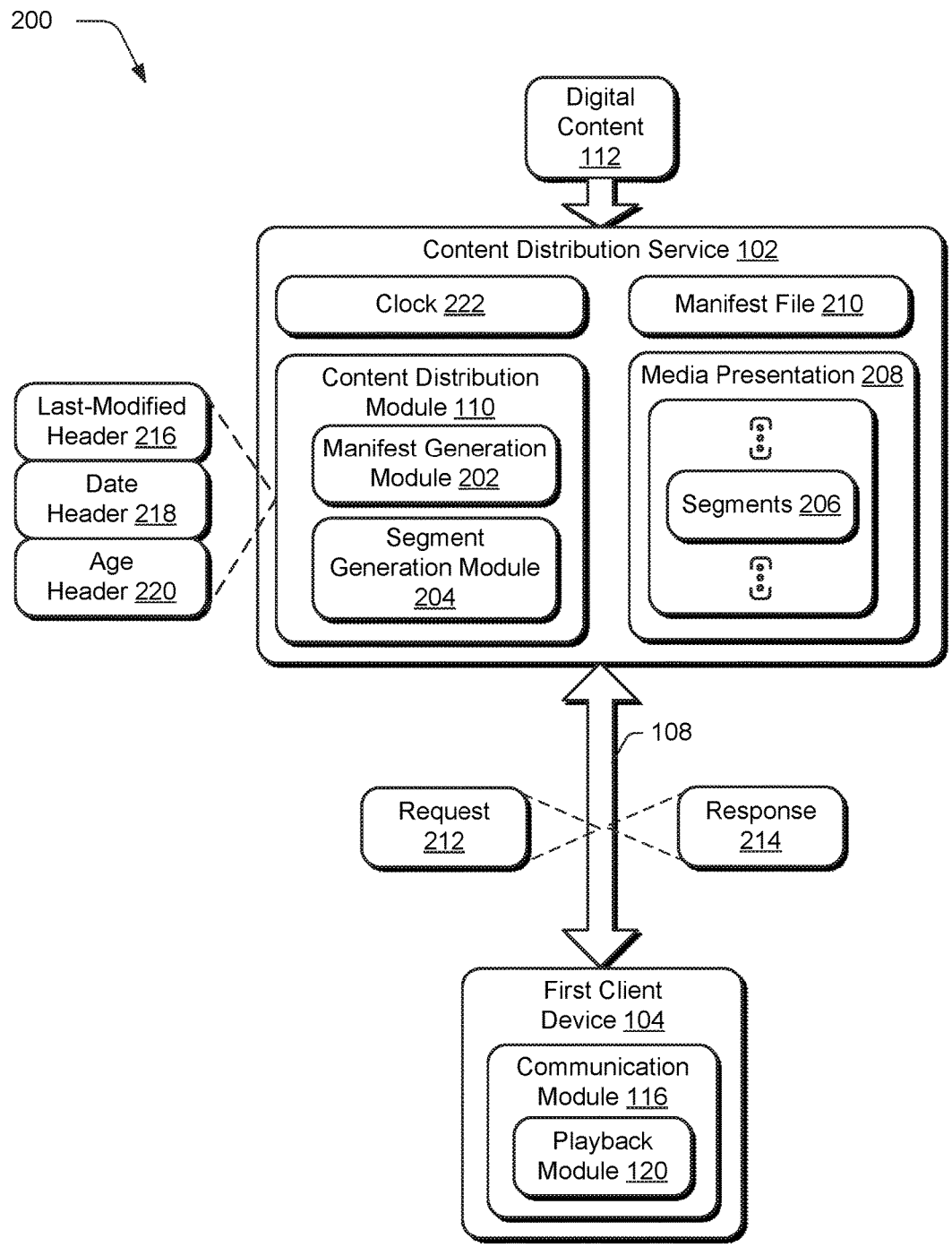
FIG. 2 depicts a system in an example implementation in which digital content is streamed by a content distribution service over a network to a client device of FIG. 1.

FIG. 2 depicts a system 200 in an example implementation in which the digital content 112 is streamed by the content distribution service 102 over the network 108 to the first client device 104. The content distribution service 102 in this example receives digital content 112 that is "live," e.g., that is captured in real time or linear as pre-recorded content that is presented in real time as though it was live. The content distribution module 110 then configures this digital content 112 for live streaming using a manifest and segment technique. To do so, the content distribution module 110 employs a manifest generation module 202 and a segment generation module 204.

The segment generation module 204 is implemented at least partially in hardware to form segments 206 in a media presentation 208. The segments 206, for instance, may be formed by the segment generation module 204 into lengths of a few seconds each from packets collected from the digital content 112. The manifest generation module 202 is implemented at least partially in hardware to form the manifest file 210 that maps respective time periods to corresponding ones of the segments 206 of the media presentation 208.

A request 212 and response 214 technique is then used to stream the digital content over the network 108 between the content distribution service 102 and the first client device 104. For example, the playback module 120 of the first client device 104 may form a request 212 for the manifest file 210 that corresponds to desired digital content 112 to be streamed. The content distribution module 110 receives this request 212 via the network 108 and forms a response 214 that includes the manifest file 210. Using the manifest file 210, the playback module 120 may determine which segments 206 of the media presentation 208 map to corresponding time periods that are desired for rendering (e.g., a most recent) and use a similar request 212 and response 214 technique request communication of and receive those segments 206.

In order to define when the segments 206 are to be rendered, the content distribution module 110 may leverage existing header fields and semantics found in manifest and segments based streaming techniques such as according to HTTP, and may do so without synchronizing local clocks of the client devices 104, 106. Examples of existing response header fields that are usable to define this "when" include a last-modified header 216, a date header 218, and an age header 220. An example of setting values of these headers is further described in the following and shown in a corresponding figure.

Figure 3:
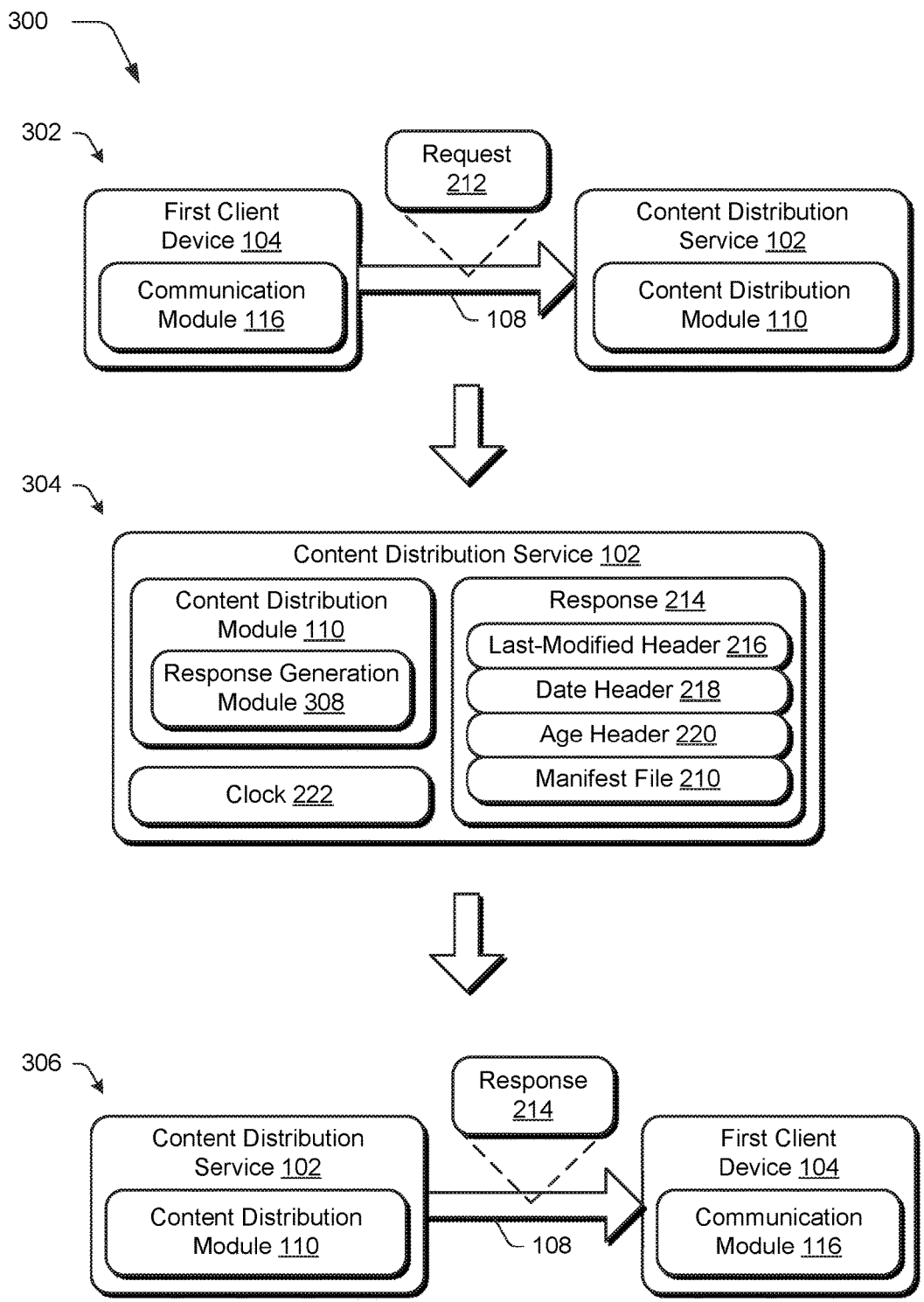
FIG. 3 depicts an example implementation of setting a last-modified header, a date header, and an age header of a response of FIG. 2.

FIG. 3 depicts an example implementation 300 of setting the last-modified header 216, the date header 218, and the age header 220 of the response 214 of FIG. 2. This implementation 300 is shown using first, second, and third stages 320, 304, 306. At the first stage 302, a request 212 is formed and communicated by the communication module 116 for receipt by the content distribution module 110 of the content distribution service 102 via the network 108. The request 212, for instance, may request communication of a manifest file 210 for use in specifying segments of content to be streamed.

At the second stage 304, the content distribution module 110 employs a response generation module 308 implemented at least partially in hardware to form the response 214. The response includes a last-modified header 216, date header 218, age header 220 (optionally), and the manifest file 210. The last-modified header 216 is set by the content distribution module 110 according to a time indicated by a clock 222 associated with the content distribution service 102 as to when the media presentation 208 of the digital content 112 was last modified, e.g., a segment 206 was added in a live streaming context.

The date header 218 is set by the content distribution module 110 according to a time indicated by the clock 222 when the response 214 is formed by the response generation module 308. In one or more implementations, the clock 222 used to set the last-modified header 216 is synchronized with and/or is the same clock 222 as used to set the date header 218.

The age header 220 is optionally used to indicate an amount of time the response 214 has spent in a cache since being formed by response generation module 308, e.g., at the content distribution service 102 or stored in one or more intermediaries (e.g., intermediary servers, routers, firewalls, and so on) used to communicate the response 214 via the network 108. The response 214 is communicated by the content distribution service 102 via the network 108 for receipt by the first client device 104 in this example. The first client device 104 may then use these headers to determine when to render segments of the digital content in a manner that is synchronized with other client devices, an example of which is described in the following.

Figure 4:
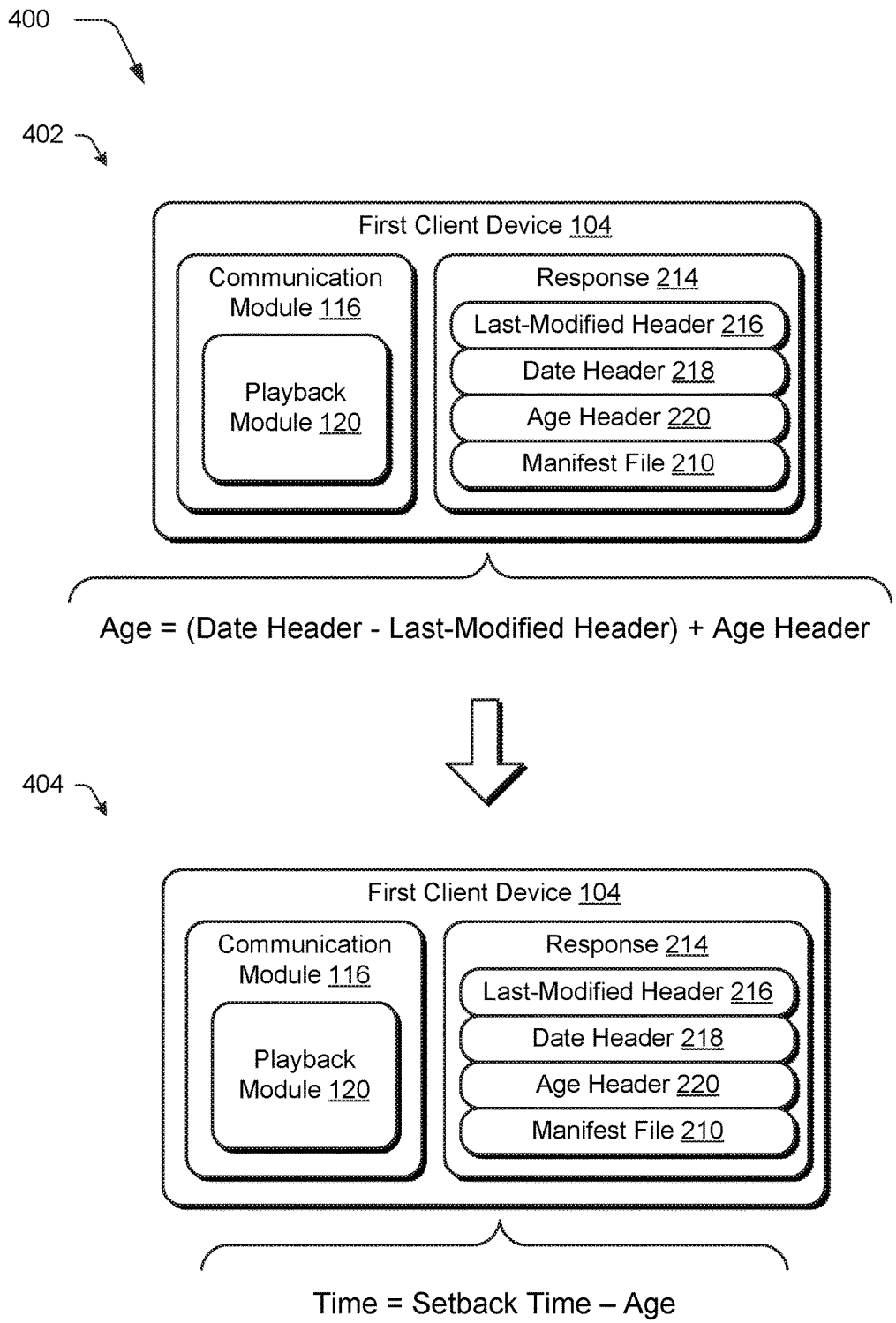
FIG. 4 depicts an example implementation of use of a last-modified header, a date header, and an age header of a response of FIG. 3 to define when to render the digital content.

FIG. 4 depicts an example implementation 400 of use of the last-modified header 216, the date header 218, and the age header 220 of the response 214 of FIG. 3 to define when to render the digital content. This implementation 400 is shown using first and second stages 402, 404. At the first stage 402, the playback module 120 determines an age of the digital content, and more particularly an age of respective segments of the digital content to be rendered. This is performed by the playback module 120 by subtracting the last-modified header 216 from the date header 218. In other words, this acts to subtract the time at which the digital content was last modified, e.g., a segment was added to the digital content, from the time at which the response 214 was generated. The age header 220, if available, is added to this result to address an amount of time the response spent in a cache when communicated, e.g., in a cache of an intermediate server of the network 108, in a cache of the content distribution service 102, and so forth. In this way, a "true age" of the response is determined without use of a clock on the first client device 104.

At the second stage 404, a time is calculated that is to be used as a basis to define when the content is rendered. This time is calculated by subtracting the age calculated at the first stage 402 from a setback time. The setback time includes an amount of time that is determined to include an amount of buffer time to promote consistent playback. The setback time may be predefined as a static amount of time that is consistent between the first and second clients 104, 106. The setback time may also be defined dynamically to reduce latency as further described in relation to FIG. 6.

This time is then used as a basis to define "when" the segments of the digital content are to be rendered. Through an ability to determine an "age" of response 214 through use of the headers and setback times, synchronization between the first and second client devices 104, 106 may be achieved. For example, the first client device 104 may determine an age that is different than an age determined by a second client device 106. Through use of the setback times and these different respective ages, the "when" of the rendering is synchronized by taking these differences into account. In one or more implementations, times that include higher precision (e.g., including fractional second portions) are used in supplemental headers to further improve accuracy over conventional HTTP headers that are limited solely to specifying time using whole seconds and above. In this way, synchronization of less than a second may be achieved. Additional examples are described in relation to the following procedures.

Example Procedures

The following discussion describes streaming digital content synchronization techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
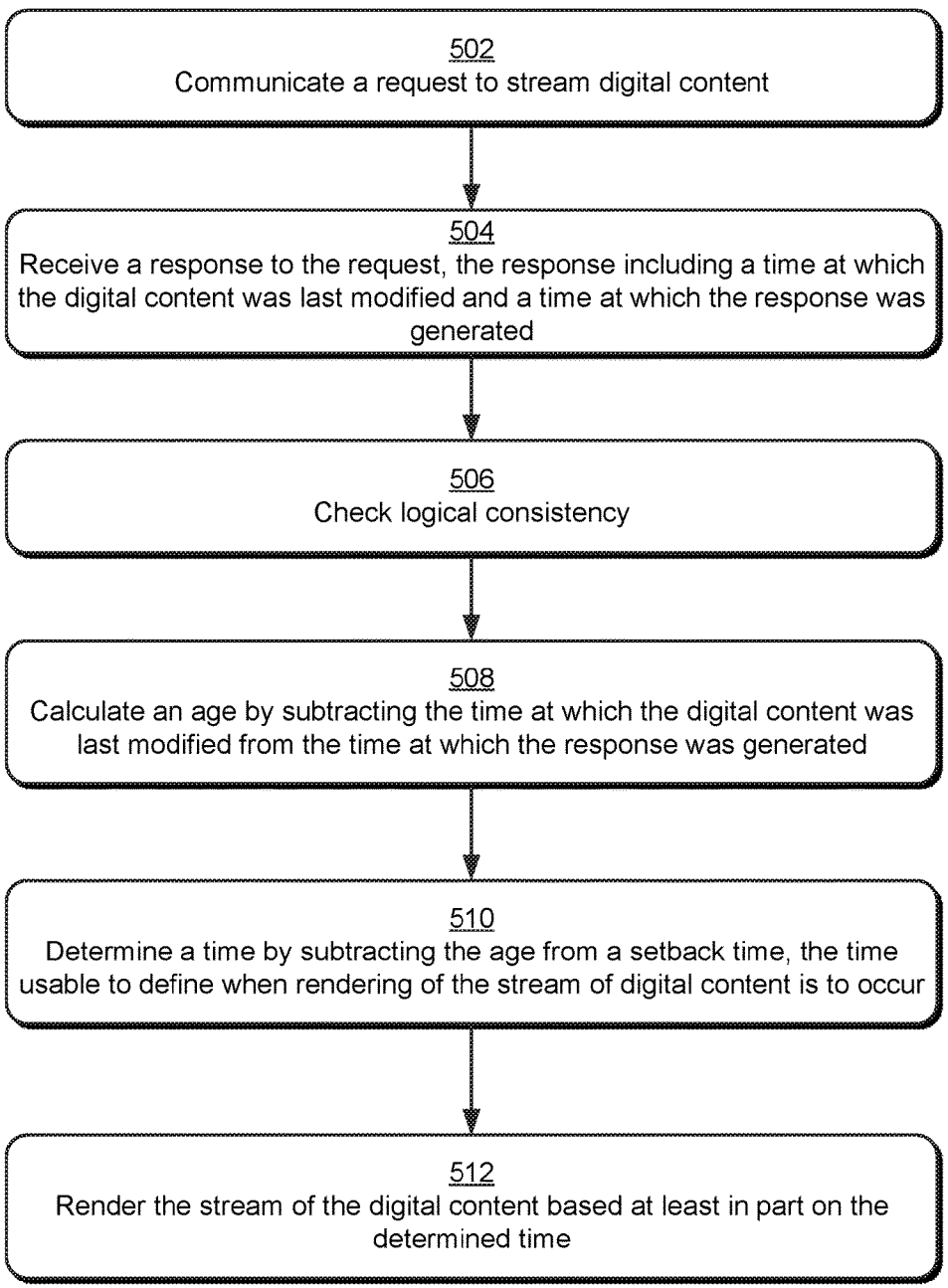
FIG. 5 is a flow diagram depicting a procedure in an example implementation in which a time used as a basis to define when to render content is determined.

FIG. 5 depicts a procedure 500 in an example implementation in which a time used as a basis to define when to render content is determined. A request is communicated to stream content (block 502). The request 212, for instance, may request a manifest file 210 to be used to stream digital content 112.

A response is received to the request. The response includes a time at which the digital content was last modified and a time at which the response was generated (block 504). The last modified time, for instance, may be specified as a last-modified header 216 (e.g., an HTTP "Last-Modified" response header) that specifies a time at which a segment 206 was added to a media presentation. The time at which the response is generated is specified using a date header 218, e.g., as an HTTP "Date" response header. The response may also include an age indicative of an amount of time the response has spent in at least one cache through use of an age header 220, e.g., as an HTTP "Age" header.

Logical consistency of the response is checked (block 506). The playback module 120, for instance, may check to determine that the date header 218 specifies a time that is not before a time specified by the last-modified header 216. If not logically consistent, the following processing is not performed, thereby protecting against errors and conserving computing resources.

An age is calculated by subtracting the time at which the digital content was last modified from the time at which the response was generated (block 508). The playback module 120, for instance, may subtract the last-modified header 216 from the date header 218. The age header 220 may also be added to this value, if available. In this way, the age describes an amount of time that has passed between availability of a newly added segment through the last-modified header 216 and generation of the response 214, to which the amount of time spent in a cache is added, if specified.

A time is determined by subtracting the age from a setback time, the time usable to define when rendering of the stream of digital content is to occur (block 510). The setback time, for instance, may include a buffering time to ensure smooth playback of the digital content 112. In live streaming, the setback time is set as a time behind an end of a most recently available segment. The setback time may be defined statically (e.g., a set amount of time) or dynamically to reduce latency as further described in relation to FIG. 6. The stream of the digital content is rendered based at least in part on the determined time (block 512). By using this technique for both the first and second client devices 104, 106, synchronization of rendering of the digital content 112 may be achieved.

Figure 6:
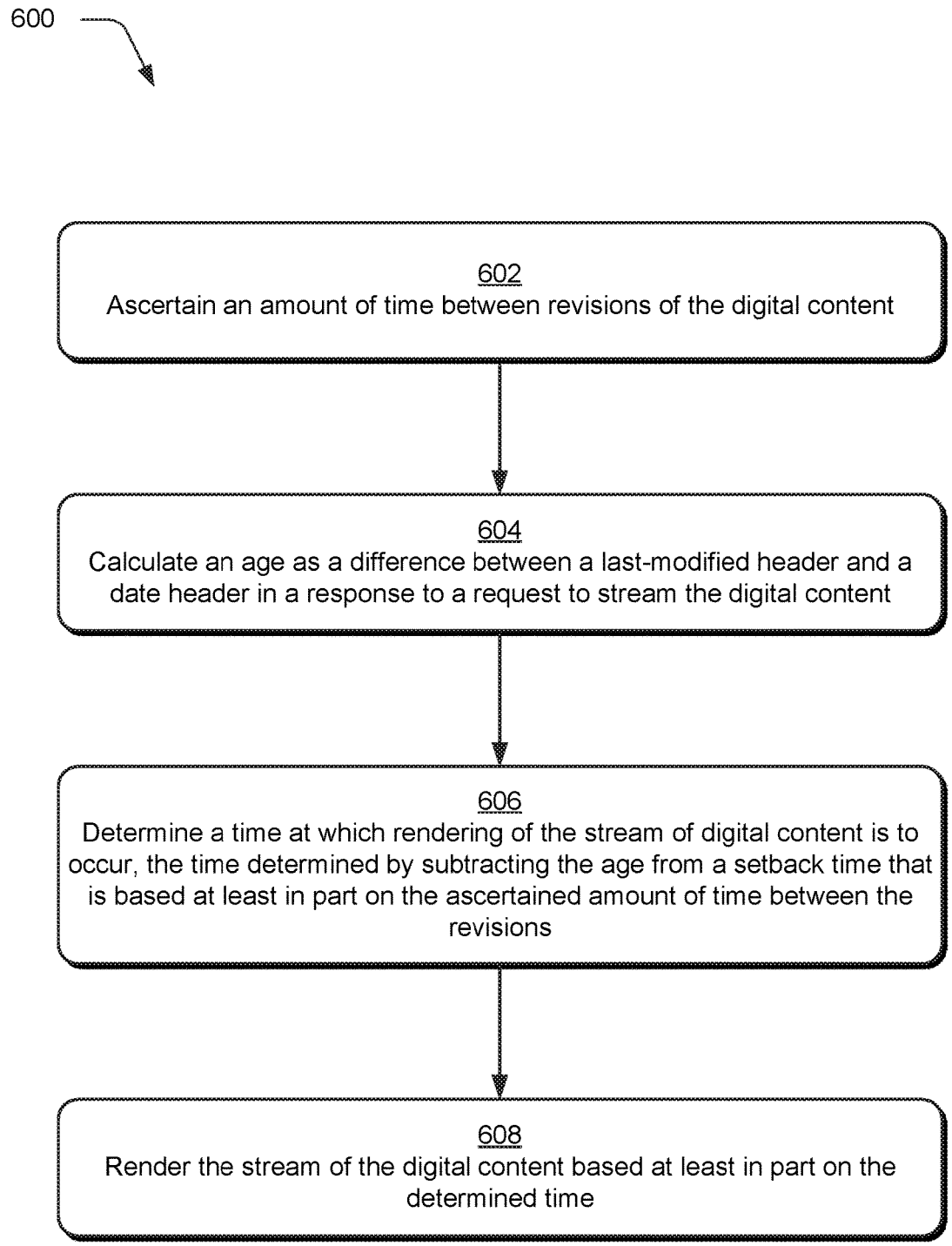
FIG. 6 is a flow diagram depicting a procedure in an example implementation in which an amount of time between revisions to digital content is ascertained and used to reduce latency in rendering of the digital content.

FIG. 6 depicts a procedure 600 in an example implementation in which an amount of time between revisions to digital content is ascertained and used to reduce latency in rendering of the digital content. An amount of time is ascertained between revisions of digital content (block 602). For example, the manifest file can specify a maximum permitted segment duration of media presentation 208. Based on this, an interval may be determined describing by when "new" segments 206 of the digital content 112 are made available, which is usable to reduce latency in rendering of the content as described in the following.

As before, an age is calculated as a difference between a last-modified header and a date header in a response to a request to stream the digital content (block 604). A time is determined at which the rendering of the stream of digital content is to occur. The time is determined by subtracting the age from a setback time as before. However, in this instance the setback time is based at least in part on the ascertained amount of time between the revisions (block 606). The setback time, for instance, may be calculated by adding a set buffering time (e.g., to ensure smooth playback) to the ascertained amount of time. In this way, rendering of the stream of digital content based at least in part on the determined time (block 608) is performed with minimal latency based on when the segments are made available for rendering. When performed by a plurality of client devices, this may also be used to enforce synchronization between the devices as well as reduce latency.

Example System and Device

FIG. 7 illustrates an example system generally at 700 that includes an example computing device 702 that is representative of one or more computing systems and/or devices that may implement the various techniques described herein. This is illustrated through inclusion of the playback module 120. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to stream digital content, a method implemented by a computing device, the method comprising:
   receiving, by a computing device, a response to a request to stream the digital content, the response including a time at which the digital content was last modified and a time at which the response was generated;
   calculating, by the computing device, an age by subtracting the time at which the digital content was last modified from the time at which the response was generated;
   determining, by the computing device, a time by subtracting the age from a predefined set-back time, the time usable to define when rendering of the stream of digital content is to occur; and
   rendering, by the computing device, the stream of the digital content based at least in part on the determined time.

2. The method as described in claim 1, wherein the time at which the digital content was last modified is set using a clock of the content distribution service that originated the response as part of a last-modified header.

3. The method as described in claim 1, wherein the time at which the response was generated is set using a clock of the content distribution service that originated the response as part of a date header.

4. The method as described in claim 1, wherein:
   the response further includes an age header indicative of an amount of time the response has spent in at least one cache; and
   the calculating of the age includes adding the age header.

5. The method as described in claim 4, wherein the cache is included as part of a content distribution service that streams the digital content or an intermediary between the content distribution service and the computing device, via which the response is communicated.

6. The method as described in claim 1, wherein the response includes a manifest file mapping time periods to respective segments of a plurality of segments within a media presentation of the digital content.

7. The method as described in claim 1, wherein the request, the response, and the rendering are configured in accordance with a hypertext transfer protocol.

8. The method as described in claim 1, wherein the last-modified header or the date header specify fractional parts of a second.

9. The method as described in claim 1, further comprising ascertaining, by the computing device, an amount of time between revisions to the digital content, and setting the set-back time based at least in part on the ascertained amount of time.

10. The method as described in claim 9, wherein the ascertaining is based on respective amounts of time at which respective segments are added to a media presentation of the digital content.

11. In a digital medium environment to stream digital content, a method implemented by a computing device, the method comprising:
    communicating, by the computing device, a hypertext transfer protocol (HTTP) request for a manifest file to stream the digital content;
    receiving, by the computing device, an HTTP response to the request, the response including a last-modified header, a date header, and the manifest file;
    calculating, by the computing device, an age by subtracting the last-modified header from the date header;
    determining, by the computing device, a time by subtracting the age from a predefined set-back time, the time usable to define when rendering of the stream of digital content is to occur;
    obtaining, by the computing device, at least one segment of the digital content from a media presentation based on the manifest file and the determined time according to the hypertext transfer protocol; and
    rendering, by the computing device, the at least one segment of the digital content based at least in part on the determined time.

12. The method as described in claim 11, wherein:
    the last-modified header is set by a content distribution service that originated the response, the last-modified header indicating a time at which the digital content was last modified as indicated by a clock of the content distribution service; and
    the date header is set by the content distribution service that originated the response, the date header indicating a time at which the response is generated as indicated by a clock of the content distribution service.

13. The method as described in claim 11, wherein:
the response further includes an age header indicative of an amount of time the response has spent in at least one cache; and
the calculating of the age includes adding the age header.

14. The method as described in claim 11, wherein the last-modified header or the date header specify fractional parts of a second.

15. The method as described in claim 11, further comprising:
ascertaining, by the computing device, an amount of time between revisions to the digital content; and
setting, by the computing device, the predefined set-back time based at least in part on the ascertained amount of time.

16. The method as described in claim 11, further comprising checking, by the computing device, logical consistency of the last-modified header with respect to the date header and wherein the calculating, the determining, and the rendering are not performed responsive to the checking that the last-modified and date headers are not logically consistent.

17. In a digital medium environment to stream digital content, a system comprising a playback module implemented at least partially in hardware of a client device, the playback module configured to perform operations comprising:
ascertaining an amount of time between revisions of the digital content;
calculating an age as a difference between a last-modified header and a date header in a response to a request to stream the digital content;
determining a time by subtracting the age from a set-back time, the set-back time based at least in part of the ascertained amount of time between the revisions, the time usable to define when rendering of the stream of digital content is to occur; and
rendering the stream of the digital content based at least in part on the determined time.

18. The system as described in claim 17, wherein:
the last-modified header is set by a content distribution service that originated the response, the last-modified header indicating a time at which the digital content was last modified as indicated by a clock of the content distribution service; and
the date header is set by a content distribution service that originated the response, the date header indicating a time at which the response is generated as indicated by a clock of the content distribution service.

19. The system as described in claim 17, wherein:
the response further includes an age header indicative of an amount of time the response has spent in at least one cache; and
the calculating of the age includes adding the age header.

20. The system as described in claim 17, wherein the last-modified header or the date header define fractional parts of a second.

* * * * *